Patented Dec. 15, 1925.

1,565,472

UNITED STATES PATENT OFFICE.

FRÉDÉRIC CHARLES FRIDTJOF LE COULTRE, OF MARSEILLE, FRANCE, ASSIGNOR TO "SOCIETE D'ETUDE DES AGGLOMÉRÉS," OF PARIS, FRANCE.

REFRACTORY CEMENT WITH A BASE OF ZIRCONIUM ORE.

No Drawing. Application filed October 9, 1924. Serial No. 742,724.

*To all whom it may concern:*

Be it known that I, FRÉDÉRIC CHARLES FRIDTJOF LE COULTRE, a Swiss citizen, and resident of Facultre des Sciences, Place Victor Hugo, Marseille, France, have invented certain new and useful Refractory Cements with a Base of Zirconium Ore, of which the following is a specification.

In an application for Letters Patent which has been filed under the Serial No. 742,723 filed Oct. 9, 1924, for "improvements relating to refractory products and their manufacture", the applicant has described a process for the manufacture of ultra-refractory products by the agglomeration of zirconiferous ores of any kind, the said process being more particularly characterized by the preparation of the zirconiferous ores employed, by a suitable composition of the mixture of powders of the ore and of the binders adapted to form the paste with which the products and objects to be manufactured are formed, and finally by a particular method of drying and baking the said objects.

The present invention, has for its subject:

(1) The new industrial product formed from a refractory cement with a base of the ore of zirconium adapted to enable refractory products with a base of the ore of zirconium to be fused to other refractory products of the same nature, or to refractory products of a different nature, such as for example bricks of clay, magnesia, chromite, alumina and so forth, the binder being obtained by mixing in determined proportions a suitable powder prepared from any kind of zirconiferous ore, almost pure oxide of zirconium, an organic binder such as dextrin, and an inorganic binder such as boric acid.

(2) A method of preparation of this cement characterized by the fact that the powder of the zirconiferous ore which enters into the composition thereof is obtained by crushing agglomerated zirconiferous ores, prepared in accordance with the process described in the specification of the application above referred to but which, in addition, are subjected to a special thermal treatment consisting in subjecting them to a prolonged baking, then passing them quickly into an electric furnace in which they are raised to a temperature of about 2500° C. and then soaking them, as they leave the furnace, in a stream of cold water.

The special thermal treatment referred to is for the purpose of preventing the shrinking of the ore used.

The dextrin and boric acid introduced into the composition of this cement tend to increase the hardening property and to agglomerate in the presence of fire.

The addition of oxide of zirconium has an enriching action which, in a general manner, improves the qualities of the cement. This cement is prepared in the following manner.

In accordance with the process described in the companion application the agglomerates of the zirconium ore are prepared in the form of cylindrical bars of a diameter of about 40 mm.

After these bars have been dried and baked in the manner indicated in the copending application they are subjected to a very prolonged baking which is followed by a rapid passage through an electric furnace in which these bars are brought to a temperature of about 2500° C. whereupon they are soaked in a stream of cold water.

These bars are then crushed and reduced into a fine powder with which there is prepared a mixture having the following composition.

| | Kg. |
|---|---|
| Powder obtained | 100 |
| Almost pure oxide of zirconium pulverized | 30 |
| Dextrin | 0.4 |
| Boric acid | 0.2 |

This composition is given by way of example and in certain cases gives the best results.

The whole is thoroughly mixed and the cement is ready for use.

In use it is advisable to proceed in slightly different ways according as to whether it is desired to combine together two refractory products with a base of zirconium ore or whether it is desired to fuse a refractory product with a base of the zirconium ore with a product of a different nature.

In the first case the cement is used as it is. It suffices to prepare with the powder mixture indicated above and with water free from calcareous salts a thick paste which serves to connect together the objects to be joined together.

If however it is desired to unite a refractory product with a base of zirconium ore and a refractory product of a different nature, the cement forming the subject of the present invention, if employed alone, would have too low a coefficient of expansion. For overcoming this disadvantage there is added thereto in suitable proportions a certain quantity of the refractory earth which constitutes the product with which it is desired to join a refractory object with a base of zirconiferous ore.

The other earths to be added to the cement are always added in small proportions. The proportion is about 20% for earths having a high co-efficient of expansion and from 3 to 5% for earths having a low co-efficient of expansion.

The cylindrical bars used for the purpose of the present invention are preferably prepared as follows.

Zirconiferous ores are heated to a very high temperature in an electric furnace with a circular enclosure and on their discharge from the furnace are precipitated into a strong current of cold water aciduated with 1/1000 sulphuric acid. The ores are crushed into a fine powder and mixed with an organic binder such as dextrin, tar or the like and with a volatile inorganic binder such as an acid, for example, boric acid or phosphoric acid, or a mineral salt. The organic binder is adapted to impart to the products the necessary consistency for the first operation between ordinary temperature and 180° whilst the second binder is capable of withstanding the temperature necessary to enable the refractory elements to effect agglomeration by the superficial fusion of the particles of the material of which they are formed. To 100 kg. of powdered ore there are preferably added 0.5 kg. dextrin and 0.25 kg. boric acid. This mixture is moulded so as to form the cylindrical bars.

Having thus described my invention what I claim as new and desire to secure by Letters Patent is:—

1. A refractory cement having a base of zirconium ore comprising a mixture of substantially pure oxide of zirconium, an organic binder, an inorganic binder and finely crushed powder of zirconium ore.

2. A refractory cement with a base of zirconium ore comprising substantially pure oxide of zirconium, dextrin, boric acid, and finely crushed powder of zirconium ore.

3. A refractory cement with a base of zirconium ore comprising a mixture of about 30 kg. of substantially pure oxide of zirconium, about 0.4 kg. dextrin, about 0.2 kg. boric acid, and about 100 kg. of finely powdered zirconium ore.

4. A method of producing a refractory cement with a base of zirconium ore comprising mixing together substantially pure oxide of zirconium, an organic binder, an inorganic binder, and finely crushed agglomerated zirconium ore prepared by heating zirconiferous ore to a very high temperature in an electric furnace with a circular enclosure and discharging the same into a strong stream of cold water aciduated with about 1/1000 part of sulphuric acid, subjecting the ore to a supplementary thermal treatment, said treatment including exposing the ore to a prolonged baking, then passing it rapidly through an electric furnace in which it is heated to a temperature of about 2500° C., and then soaking it in a stream of cold water.

FRÉDÉRIC CHARLES FRIDTJOF LE COULTRE